(12) United States Patent
Thurner

(10) Patent No.: US 7,461,171 B2
(45) Date of Patent: Dec. 2, 2008

(54) SYSTEM, METHOD & APPARATUS OF PROVIDING PROCESS DATA TO A CLIENT

(75) Inventor: Elmar Thurner, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 569 days.

(21) Appl. No.: 10/145,622

(22) Filed: May 10, 2002

(65) Prior Publication Data

US 2003/0009572 A1  Jan. 9, 2003

(30) Foreign Application Priority Data

Aug. 7, 2001  (DE) ................. 101 38 710

(51) Int. Cl.
*G06F 15/16* (2006.01)
*G06F 17/00* (2006.01)
(52) U.S. Cl. .................. 709/246; 709/203; 715/236
(58) Field of Classification Search ......... 709/229, 709/203, 246; 715/236
See application file for complete search history.

(56) References Cited

U.S. PATENT DOCUMENTS

| | | | |
|---|---|---|---|
| 6,507,856 B1 * | 1/2003 | Chen et al. ................. 715/513 |
| 6,526,362 B2 * | 2/2003 | Jones et al. ................. 702/82 |
| 6,721,793 B1 * | 4/2004 | Corless ....................... 709/229 |
| 6,859,798 B1 * | 2/2005 | Bedell et al. ................ 706/45 |
| 7,010,294 B1 * | 3/2006 | Pyotsia et al. .............. 709/203 |
| 2002/0156838 A1 * | 10/2002 | Batke et al. ................ 709/203 |

* cited by examiner

*Primary Examiner*—Jason Cardone
*Assistant Examiner*—Tanim Hossain
(74) *Attorney, Agent, or Firm*—Baker Botts L.L.P.

(57) ABSTRACT

Process data to a client is provided for process data to a client from a server in an Industrial Automation System. An incompletely determined and/or extensible request for process data from the client by the server is received. The structure and kind of process data to be sent to the client by a server application is determined. An XML type message of meta data being descriptive on structure and kind of the process data and the process data are generated. The XML type message is then sent to the client.

12 Claims, 4 Drawing Sheets

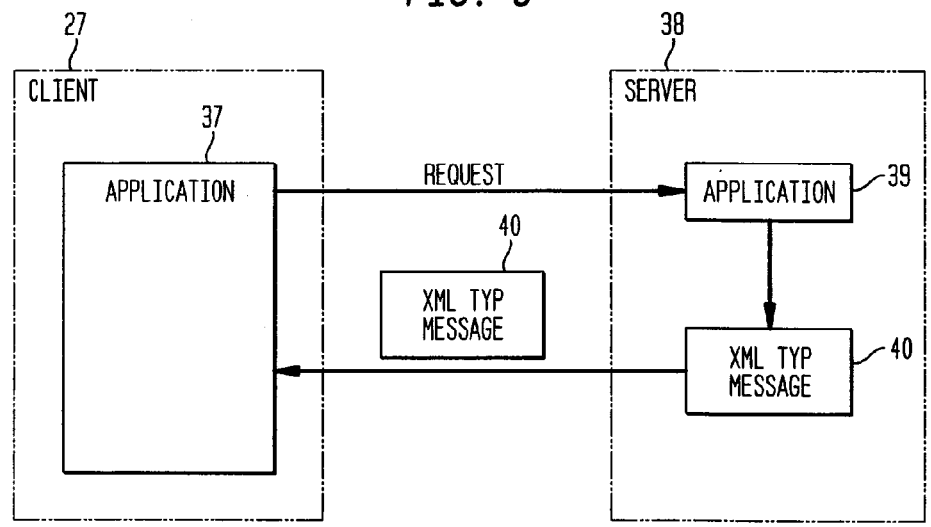
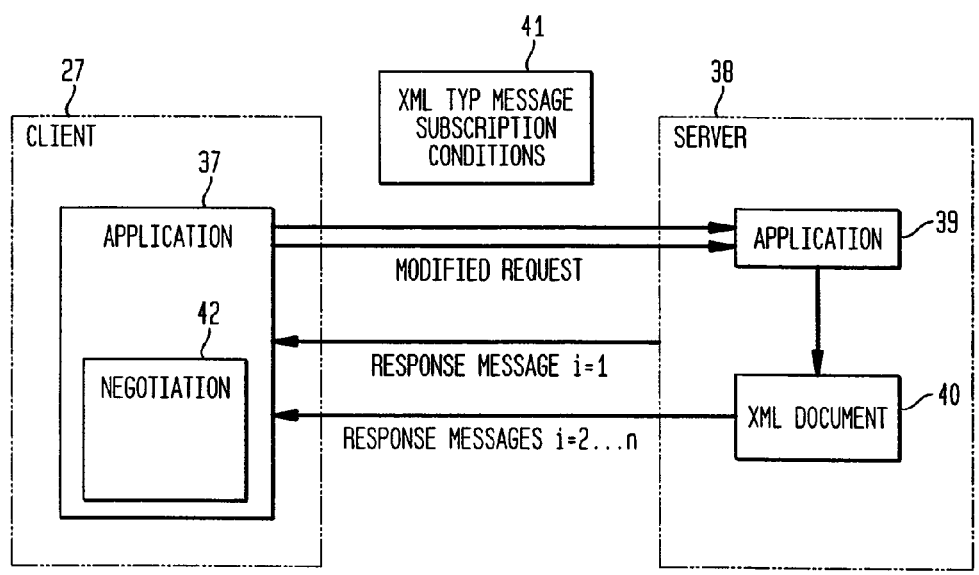

SYSTEM, METHOD & APPARATUS OF PROVIDING PROCESS DATA TO A CLIENT

CROSS REFERENCE TO RELATED APPLICATION

This application claims priority to German application number 10138710.5 filed Jul. 8, 2001.

BACKGROUND

1. Field of Invention

The present invention relates to the field of providing process data to a client, such as for monitoring an Industrial Automation System.

2. Related Information

Remote monitoring and control of systems and processes have taken many forms. In the past, dedicated lines became the most common form of communication between a Control System and a remote location. Even today, many industry systems prefer to employ dedicated lines because they are secure, meaning that sensitive data, such as proprietary Industrial software code, is not at risk of being intercepted by competitors, and they are reliable, since there are less problems with connectivity and redundancy, for example, in such a direct connection.

For all of the advantages of the dedicated line, this method of connection has limited application because the Control System is, for one thing, not accessible from multiple locations. For this reason, amongst others, Industrial technologists have explored the use of Modems to make access to the Control System possible from different locations While Modems appear to solve the problem of remote connectivity, the actual reality is that these types of systems are much too unreliable, particularly in the Industrial field where information transmission is critical to a manufacturing process, for example. As a result, the practical use of Modems is generally restricted to downloading and uploading data files. In other words, providing any type of control function between locations is rather limited in this type of environment. Further, an end user generally required a customized interface to access the Control System.

With the explosion and subsequent growth of the Internet, the World Wide Web provides a promising, delivery platform that offers an opportunity for organizing and providing Internet data. The Web, a network of documents called sites or pages stored on server computers throughout the world, could provide access any Industrial system anywhere. Moreover, it is conceivable, for example, that data could be sent via hypertext links, for example, on a client server system. In this manner it is possible that a system could b provided that will, not only provide remote access for Industrial systems, but also give each end user the same degree of a user friendly interface with the same universal access to services on the Web.

However, the solution of remote access is not as easily implemented as that. Each Web page usually contains Text, i.e., some type of Multimedia offerings such as Graphic Images, Video, or Audio, and possible Hypertext Links to other documents. And that is an oversimplification of the media needed to support a client server Web Page. In addition, a Browser is required to allow a user to read the pages and interact with the choices associated with it. Normally, the Browser is a graphical software program that sends commands to the Internet Web site and displays whatever information is available on the page. While various Browser programs are commercially available from different manufacturers, it is too simplistic to expect that merely launching a Browser will solve all the connectivity problems and protocol issues required to, for example, access data and control remote Industrial Controllers.

A particular example that frustrates the use of the Internet Network for Critical Applications, such as in the Industrial Control Industry, is that the Internet is based on the fundamental concept of connecting multiple hubs together to form a network of access. Thus, a single Internet Server may handle thousands of general purpose computer connections at a moment through a single connection. The problem with this philosophy, while practical for broadband communication to remote sites, therefore, is that the Internet has no innate ability to differentiate traffic in terms of its purpose or the criticality of its data. Indeed, TCP/IP (Transfer Communication Protocol/Internet Protocol) is based on the Ethernet Protocol developed at Xerox Park, mostly to the credit of Robert Metcalfe, and Ethernet dices the data to be transmitted into packets that are often jammed together with packets from other sources of data to form a transmission stream. The Internet is no longer a network of computers that often shares a single transmission connection To compound the problem, the Web may be interconnected or may be set up as a point to point link, such as in peer to peer communication. The Internet may, as well, involve both general purpose stations and specialized infrastructure components. For example, there are routers and firewalls that need to be dispensed with. These and other hardware and firmware issues need to be resolved.

Another fundamental principal of the Internet is that the type of personal computer or work station used by the end user to connect to the Web is typically of no regard to the Internet. Communication over the Internet and other networks accepts one of several types of protocols. Protocols such as Internet Protocol (IP) provide for file transfers, electronic mail, and other services. However, in specialized applications, such as Industrial Networks, it is possible that special provisions are required at the user end to interface with the user.

On the other side of the Industrial Connectivity issue, are the Programmable Logic Controllers. These are widely used in Industry and Process Control. Many manufacturers provide factory automation information using Microsoft Windows™ and other systems providing communication networking capabilities. However, these networks are usually slow, are not universally accessible and are limited to monitoring and data exchange.

Control may be implemented using such networks, but since the communication networks are non-deterministic, control is simply not in real time. Perhaps, specialized Industrial Network Systems using proprietary Fieldbus alternatives, but these can be very expensive. For one thing, conversion products are required to allow information carried over those networks to be visible on a general purpose network. Moreover, there are significant installation and other deployment costs associated with the existence of such intermediate devices. Firewalls between the Web server and the application are designed to solve problems of security and are not designed for high performance.

U.S. Pat. No. 6,061,603 discloses an Interface between an Industrial Control System and a Web Browser is known. This System is explained by making reference to FIG. 1.

FIG. 1 shows an overview block diagram of a typical system illustrating the relationship between a user 2 at a remote location and an Internet Web site 4 used for monitoring a Process Control System 6. The user 2 will have a personal computer (PC) 8 having a commercially available Browser 10, such as Netscape Communication's Navigator or Microsoft's Internet Explorer, installed for viewing the contents at the Web site 4 by a monitor 12.

The PC provides a remote Human-Machine Interface (HMI) to the process Control System 6. Various interconnection services are readily available to provide the physical and electrical interconnection from the PC to the Internet 14 itself. The Internet 14 is a collection of independent world wide communication networks that are interconnected to each other and function as a single connectionless entity.

Communication is based on a client-server basis, using a number of established protocols that allow for communication and file transfers between the client and the server. The most widely used protocol is Internet Protocol (IP).

The Web site 4 includes a network interface 16 having an unique Internet address 18, a server 20, and an application program 22. The server 20 acts as the HTTP interpreter which uses TCP in conjunction with IP, through TCP/IP stack 24 to interact with the network interface 16 and the application program 22.

This enables the data transfer between the application program 22 and the user 2 through the Internet 14. The application program provides data from the process Control System 6. This data can be used to monitor the control process by the user 2 at the remote location. The TCP/IP stack 24 enables data transfers over the Internet 14 between the user 2 and the Web site 4 as required for the various layers specified by the IP protocol.

The user 2 can connect to the Internet 14 using one of a number of Internet service providers and will enter the address of the Web site 4 when connected. The Web site 4 will display a home page which may contain text, some type of multimedia offerings such as graphic images, video, or audio, and possible hypertext links to other documents.

The Browser 10 will allow the user 2 to read the page and interact with the choices associated with it. The Browser 10 will send commands to the Web site 4 which will use the application program 22 to display whatever information is available from the process Control System 6. The Browser 10 functions as a remote human-machine interface or HMI control of the process Control System as will be detailed below.

Another prior art approach is OLE for Process Control (OPC).

At a high level, an OPC server is comprised of several objects: the server, the group, and the item. The OPC server object maintains information about the server and serves as a container for OPC group objects. The OPC group object maintains information about itself and provides the mechanism for containing and logically organizing OPC items.

The OPC Groups provide a way for clients to organize data. For example, the group might represent items in a particular operator display or report. Data can be read and written. Exception based connections can also be created between the client and the items in the group and can be enabled and disabled as needed. An OPC client can configure the rate that an OPC server should provide the data changes to the OPC client.

There are two types of groups, public and local (or 'private'). Public is for sharing across multiple clients, local is local to a client. There are also specific optional interfaces for the public groups. Within each Group the client can define one or more OPC Items.

The OPC Items represent connections to data sources within the server. An OPC Item, from the custom interface perspective, is not accessible as an object by an OPC Client. Therefore, there is no external interface defined for an OPC Item.

All access to OPC Items is via an OPC Group object that "contains" the OPC item, or simply where the OPC Item is defined. Associated with each item is a Value, Quality and Time Stamp. The value is in the form of a VARIANT, and the Quality is similar to that specified by Fieldbus.

Note that the items are not the data sources—they are just connections to them. For example, the tags in a Control System exist regardless of whether an OPC client is currently accessing them. The OPC Item should be thought of as simply specifying the address of the data, not as the actual physical source of the data that the address references.

An OPC application comprises COM (Communication Objects Model) or DCOM (Distributed Communication Object Model) objects and interfaces implemented by OPC servers.

The distributed component objects model (DCOM) is a protocol that enables software components to communicate directly over a network.

DCOM is an extension of the Component object Model (COM). COM defines how components and their clients interact. This interaction is defined such that the client and the component can connect without the need of any intermediary system component. In today's operating systems, processes are shielded from each other. A client that needs to communicate with a component in another process cannot call the component directly, but has to use some form of interprocess communication provided by the operating system. COM provides this communication in a transparent fashion: It intercepts calls from the client and forwards them to the component in another process. When client and component reside on different machines, DCOM replaces the local interprocess communication with a network protocol.

Network connections are inherently more fragile than connections inside a machine. Components in a distributed application need to be notified if a client is not active anymore, even—or especially—in the case of a network or hardware failure.

DCOM uses a pinging protocol to detect if clients are still active. Client machines send a periodic message. DCOM considers a connection as broken if more than three ping periods pass without the component receiving a ping message. If the connection is broken, DCOM decrements the reference count and releases the component if the count has reached zero. From the pont of view of the component, both the benign case of a client disconnecting and the fatal case of a network or client machine crash are handled by the same reference counting mechanism.

With DCOM, any component can be both a provider and a consumer of functionality. The same mechanism and features manage communication in both directions, making it easy to implement peer-to peer communication, as well as client/server interactions. In more recent work DCOM is replaced by a more loosely coupling between client and server through messages being sent from clients to server and vice versa.

Although message based communication is used a lack of flexibility and a lack of extensibility is a common disadvantage of the above described prior art approaches. For example if one of the software components is modified or if a new functionality is added the other components which interact with that component need to be adapted correspondingly.

It is therefore an object of the present invention to provide for an improved method of providing process data to a client, and to provide for a corresponding computer program product as well as improved server and client computers of an Industrial Automation System.

The object of the invention is solved by applying the features laid down in the respective independent claims. Preferred embodiments of the invention are given in the dependent claims.

The present invention is particularly advantageous in that it provides for a flexible, open and extensible communication means for client-server communication in an Industrial Automation System. This enables to modify and/or to add functionality to a server or client application without having to change or adapt other system components. This is made possible by the usage of mark up languages like XML or SGML or a similar mark up language as a transport and control format for the client-server communication.

In the following parts of this document the term "XML type message" is used for a document or text or message or parameter containing information formulated using a markup language like XML, SGML or alike. The term "XML-type" is used as an adjective to specifiy that a text, document, message or parameter is formatted according to a markup language like XML, SGML or other markup langues which enable a structuring of information.

The term "protocol" is used for a defined, specified or standardised sequence of messages, documents, function-calls or method-calls from a client to a server and vice versa.

Extensible means that a client or server can add additional data or meta data to a request or response without breaking compatibility with the protocol.

In accordance with a preferred embodiment of the invention the client computer directs a more or less unspecific request for runtime process data to a server of the Industrial Automation System. In response to this request the server determines the structure and the kind of process data to be provided to the client e.g. according to the request and the state or capabilities of the server.

A server application generates an XML type document with meta data being a description of the structure and/or meaning of the data being sent and containing the process data itself. This XML type document is sent to the client computer and is interpreted by an application program of the client computer. It is an important advantage that the content and/or structure of the data contained in the response message is not defined or is only partly defined by the requesting client. Rather, it is defined dynamically by the server both in structure as well as in content.

Furthermore it is possible, that the data contained in the response message and described by the meta data of the response message can itself be a text formulated using a markup language like XML and adding another level of flexibility and extendability.

In accordance with a further preferred embodiment of the invention the client computer makes the unspecific request mentioned above in the form of an XML type message.

In accordance with a further preferred embodiment of the invention the client computer makes a more specific request in the form of an XML type messsagewhich contains a subscription condition for process data.

For example if a subscription condition is met a refresh operation is to be performed and an XML type response message shall be sent. In principle any condition can be coded into the XML type message provided by the client to the server. Typical conditions are a certain cycle time for the data refresh or a change of a process parameter or parameters.

Alternatively or in addition in accordance with a preferred embodiment of the invention the XML type message from the client can also contain (meta) data which is a description or specification (e.g. a structure) of the process data to be provided by the server. This description or specification is extendible and open i.e. not fully specified in the specification of the access protocol. This enables that specific clients can formulate their own description or specification without braking the specification of the protocol and therefore being more flexible.

The server computer provides an acknowledgement to the client computer in which it informs the client if it can fulfil the specification contained in the request document provided by the client computer. If the contrary is the case this is also signalled to the client computer. In one embodiment the client computer modifies the specification contained in the XML document and sends a new XML document to the server computer until an acceptable XML document has been "negotiated" between the client and the server.

In accordance with a further preferred embodiment of the invention the server communicates to the client the specifications which it can support in form of a part of an XML type message. Based on this server information the client formulates the specifications contained in the XML type data request message. This can be done by selecting a subset of the specification supported by the server on the client side.

In accordance with a further preferred embodiment of the invention a certain set of specifications is standardized. Additional customer or manufacturer specific specifications can be added.

BRIEF DESCRIPTION OF THE DRAWINGS

FIG. 3 is a block diagram illustrating the client-server communication in accordance with the present invention, FIG. 4 is a block diagram illustrating the client server communication in accordance with the present invention.

DETAILED DESCRIPTION OF THE PREFERRED EMBODIMENTS

Figure 1:
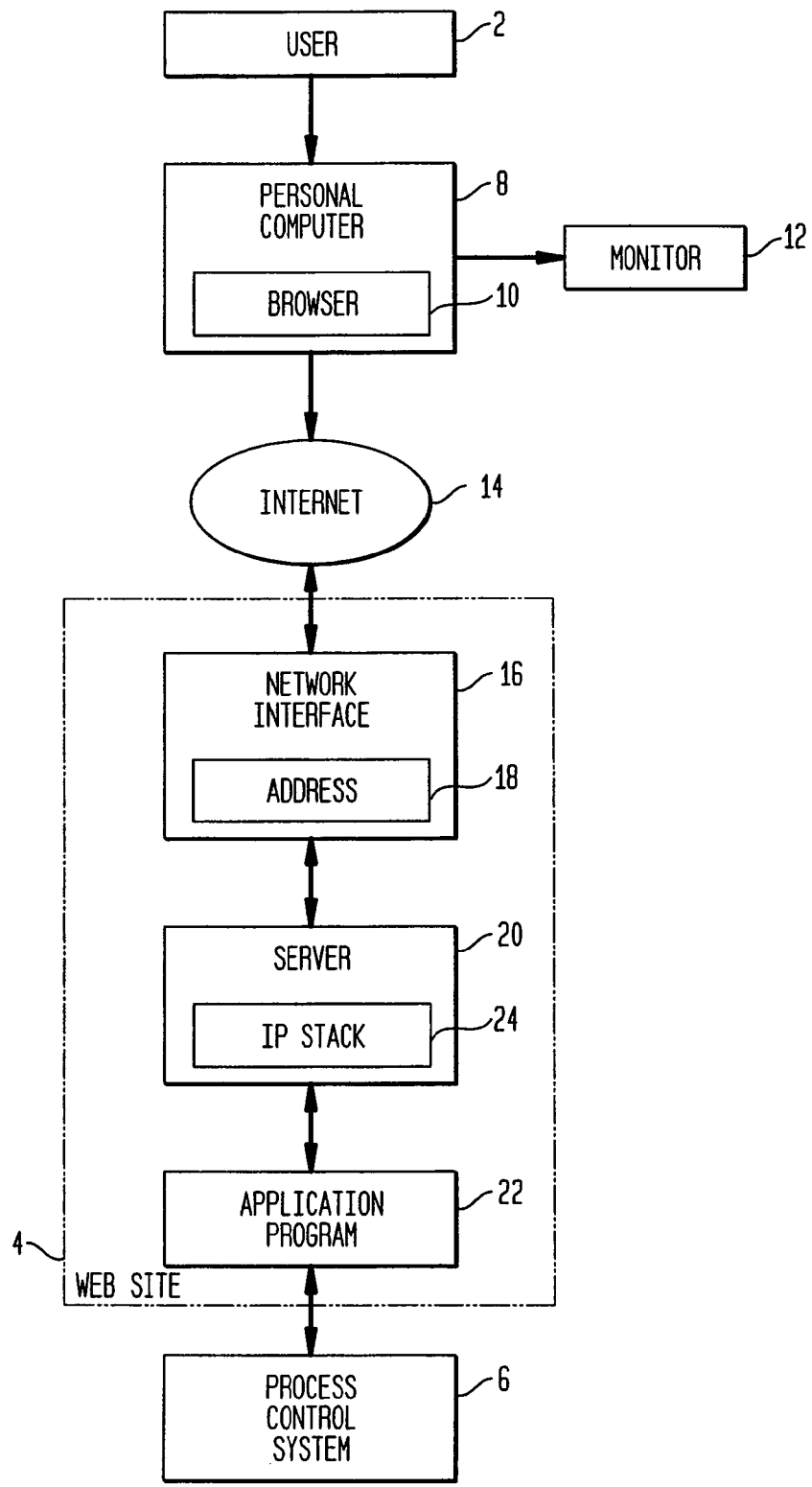
FIG. 1 is a block diagram of a prior art Automation System.
Figure 2:
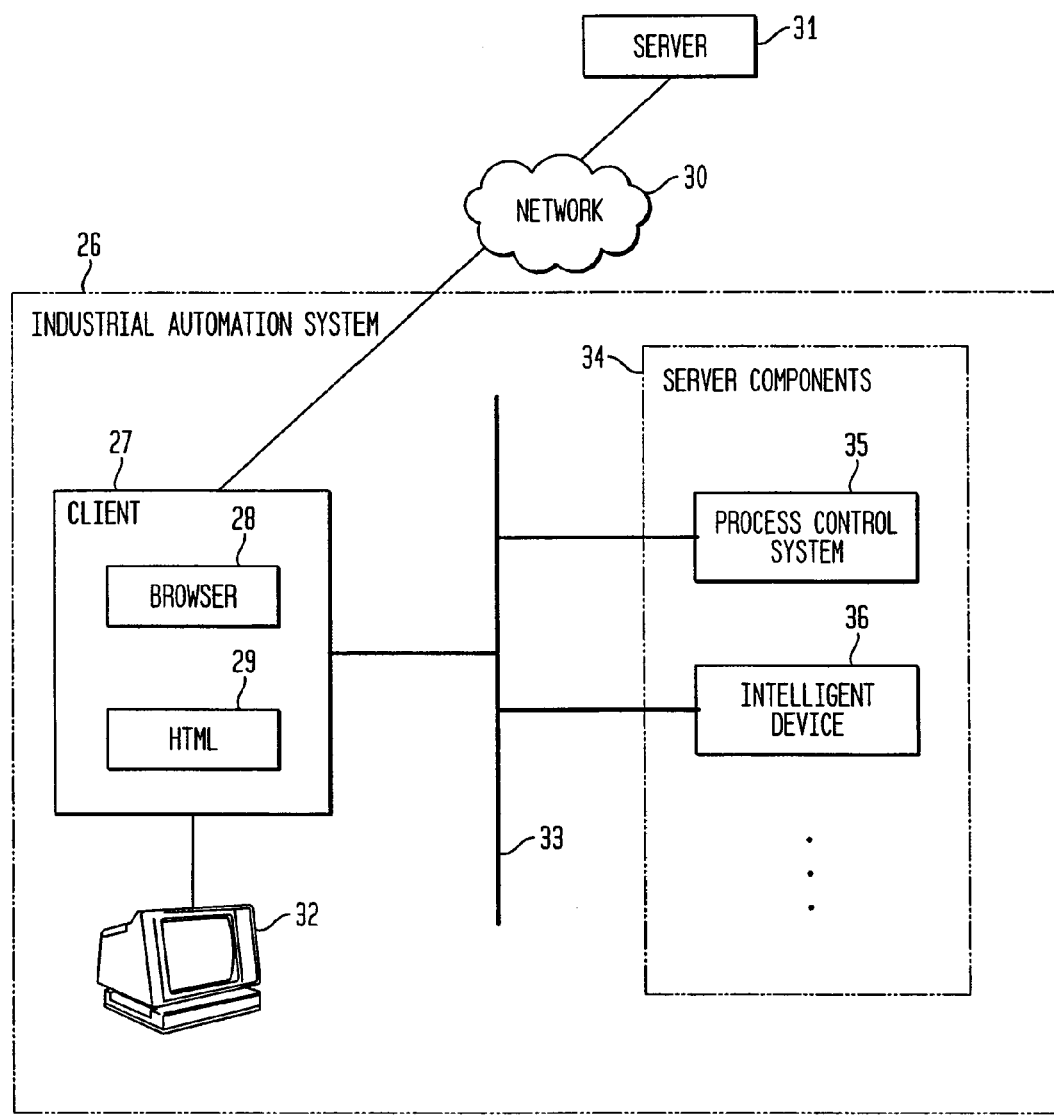
FIG. 2 is a block diagram of an Industrial Automation System of the invention.

FIG. 2 shows an Industrial Automation System 26 with one or more clients 27. Each of the clients 27 has a Browser program 28 and storage 29 for storing of an HTML document or another representation of the client GUI. The HTML document can be permanently stored on each client 27 or it can be loaded via network 30, such as the Internet, from a server 31. A monitor 32 is connected to the client 27 for visualizing the process being performed by the Industrial Automation System.

The client 27 is connected via bus 33 to one or more server components 34, such as a programmable process Control System 35, intelligent devices 36 and others. Each of the server components 34 can act as a server when addressed by the client 27.

In the implementation of FIG. 3 the client 27 has an application 37 for sending a request to a server 38. Each of the server components 34 of FIG. 2 can take the role of server 38, for example Process Control System 35 or devices 36.

The server 38 normally has an application 39 to generate an XML type message 40 and to send the XML type message 40 to the client 27.

In operation the application 37 generates an unspecific request for runtime process data from the server 38. When this request is received by the application 39, the application 39 determines the kind of data to be provided to the client 27.

The program logic of the application 39 can decide to select all up-to-date process data or a subset of the process data to communicate these process data to the client 27. Further, the application 39 determines a data structure for communicating this process data to the client 27. Based on this, the application 39 generates the XML type message 40 which contains the meta data and the process data itself. This XML type message is interpreted by the client application 37. For example, this allows application 37 to generate a display to visualize the process data for the user.

FIG. 4 shows an alternative implementation where the same reference numerals are used for like elements as in FIG. 3. Here, the sequence of request response messages is standardised by a specification of the protocol but not all possible request conditions.

In this implementation the application 37 generates an XML type message 41 to provide an extensible and possibly client specific request to the server 38. For example, the XML type message 41 contains a subscription condition, such as the rate or a condition for refresh operations. Alternatively, or in addition, the XML type message 41 also specifies which process data are required and it can also contain (meta) data to describe the expected structure of the process data.

The XML type request message 41 is interpreted by the application 39. If the application 39 determines, that it cannot fulfill the specification as contained in the XML type request message 41 it sends a corresponding XML type response message (i=1) to the client 27.

The application 37 has a negotiation program module 42 to adapt the initial XML type request message 41 in accordance with the server response if necessary. When the application 39 did not acknowledge the XML type request message 41 but rejected the request, the negotiation program module 42 modifies the original XML message 41 correspondingly.

In this case application 37 retries its request with the modified XML type request message 41. Again, the application 39 checks if it can meet the specification contained in the XML type message 41. If it can meet the modified specifications, it sends an acknowledgement response message (i=1). In the opposite case, a different response message (i=1) is sent back to the application 37 such that the negotiation program module 42 performs another modification of the specification of the XML type message 41 for another retry.

This process is repeated until the application 39 determines that it can actually meet the specifications contained in the XML type message 41. In this instance the application 39 sends a response message (i=1) to the client 27.

When the subscription condition which is specified in the XML type message 41 is met, the application 39 automatically generates the XML type message 40 containing the required process data. This XML type message 40 is sent to the client 27.

The XML type document 40 is sent as response message (i=2) to the application 37. In the following, a new response message i is sent each time the subscription condition is fulfilled. This results in a number of i=2 . . . n response messages containing XML type messages 40.

In order to "negotiate" the specifications of the client-server communication the server 38 can also provide an XML document to the client 27, which describes the specifications, can be met by the application 39. The application 37 of the client 27 then selects a subset of this specification for the XML type message 41.

Figure 5:
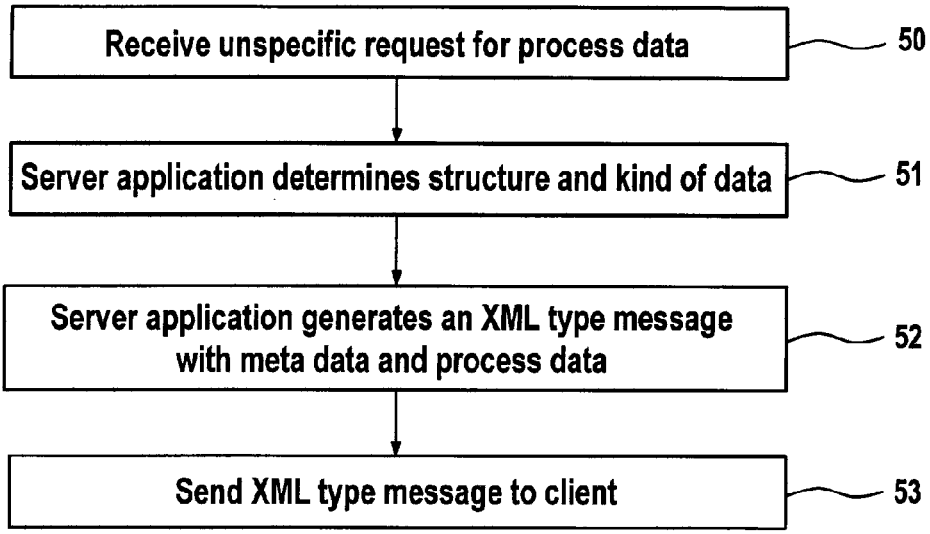
FIG. 5 is illustrative of the method of the invention.

FIG. 5 shows a flowchart which corresponds to the implementation of FIG. 3. In step 50, an unspecific request for runtime process data is received from the client by the server.

In step 51, the server application itself determines the structure and the kind of data to be provided to the client in response to the request.

In step 52, the server application generates an XML type document with meta data and process data corresponding to the structure and the kind of data determined in step 51. In step 53, the XML document is sent to the client.

Figure 6:
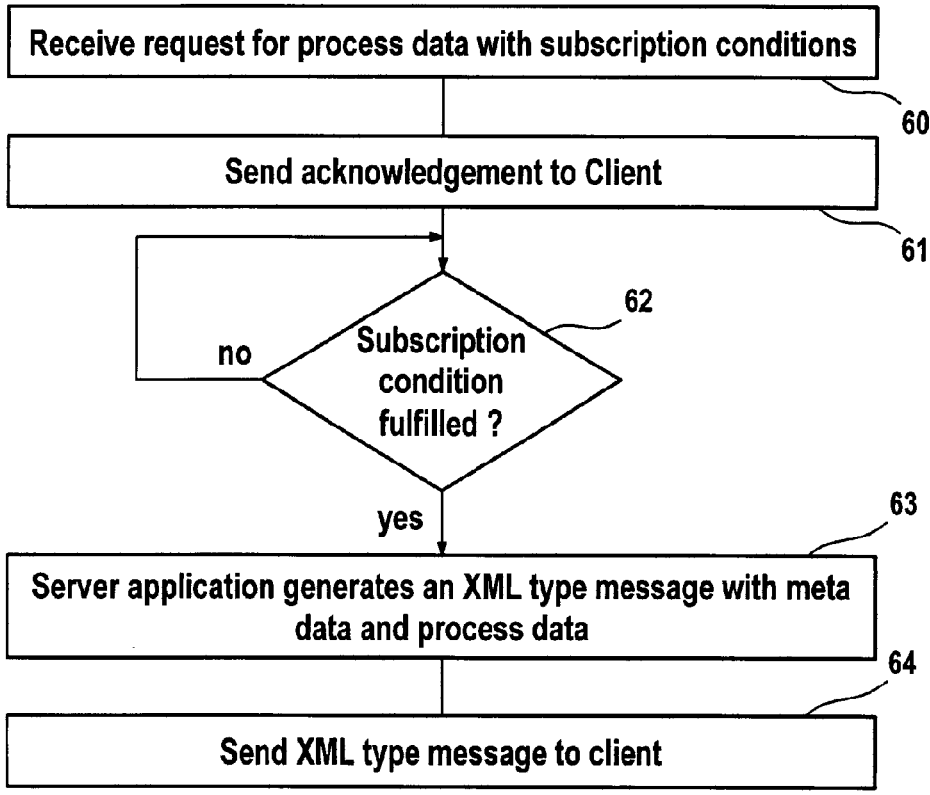
FIG. 6 is illustrative of another the method of the present invention.

FIG. 6 is illustrative of an alternative method corresponding to the block diagram of FIG. 4. In step 60, a specific request for process data with subscription conditions is received in the form of an XML document. In case the client application can process the request as specified, it sends a corresponding XML type response message to the client in step 61.

The fulfilment of the subscription condition is watched in step 62. Any time when the subscription has been fulfilled, the server application generates an XML document with meta data and process data as negotiated between the server and the client as indicated by step 63. The XML document generated is sent to the client in step 64.

The invention claimed is:

1. A method of providing process data to a client from a server in an Industrial Automation System, the method comprising the steps of:

receiving an unspecific request for runtime process data of a process, which is at least a process controlled and monitored by the Industrial Automation System, from the client by the server, wherein the request serves to initiate a data transfer from the server to the client and wherein the request contains an incomplete specification of structure and kind of process data/content to be provided by the server such that the server is enabled to decide which data shall be sent to the client;

determining within the server a kind of process data to be provided to the client;

selecting as process data from the determined kind of data either all up-to-date process data or a subset of process data;

determining a data structure for communicating the process data to the client;

generating an XML type message comprising meta data being descriptive of the kind and the data structure of the process data and comprising the process data; and sending the XML type message to the client.

2. The method of claim 1, wherein the request being descriptive of a data selection, query, subscription and other conditions, wherein the selection, query or subscription condition is extensible so that the structure/content of the selection, query, condition is capable of being specific for different clients while all different clients are compliant with the protocol.

3. The method of claim 1, wherein the request is an XML-type message.

4. The method in accordance with claim 1, wherein the request or the response XML type message is an XML document where the specification of the selection-condition or query is formulated as an extensible XML element being compliant with the protocol even if the client extends the request in a client specific way.

5. The method of claim 2, wherein the subscription condition is received in the form of a second XML type message.

6. The method of claim 5, wherein the second XML type document further comprising second meta data being descriptive of a structure of the requested process data.

7. The method of claim 2, further comprising an acknowledgement XML type response message that indicates to the client in a case where the subscription condition can be fulfilled by the server.

8. The method of claim 1, wherein the client and the server are at remote physical locations with respect to another.

9. The method of claim 8, wherein the client is coupled remotely to the server via access through internet.

10. A computer program product storing a program executable by a computer comprising program means for performing a method in accordance with claim 1.

11. The method in accordance with claim 1, wherein the request and the response XML type message is an XML document where the specification of the selection-condition or query is formulated as an extensible XML element being compliant with the protocol even if the client extends the request in a client specific way.

12. A server computer for an Industrial Automation system comprising:

means for determining a kind of runtime process data for a process being control and monitored by the Industrial Automation System, said process data to be provided to a client in response to an unspecific request received from the client, wherein the request serves to initiate a data transfer from the server to the client and wherein the request contains an incomplete specification of structure and kind of process data/content to be provided by the server such that the server is enabled to decide which data shall be sent to the client;

means for selecting as process data from the determined kind of data either all up-to-date process data or a subset of process data;

means for determining a data structure for communicating the process data to the client;

means for generating an XML type message with meta data being descriptive on the kind and the data structure and meaning and comprising the process data; and means for sending the XML type message to the client.

* * * * *